United States Patent
Golovanov

(10) Patent No.: US 9,853,995 B2
(45) Date of Patent: Dec. 26, 2017

(54) SYSTEM AND METHOD FOR RESTRICTING PATHWAYS TO HARMFUL HOSTS IN COMPUTER NETWORKS

(71) Applicant: Kaspersky Lab ZAO, Moscow (RU)

(72) Inventor: Sergey Y. Golovanov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 155 days.

(21) Appl. No.: 13/672,550

(22) Filed: Nov. 8, 2012

(65) Prior Publication Data
US 2014/0130160 A1    May 8, 2014

(51) Int. Cl.
*G06F 11/00* (2006.01)
*H04L 29/06* (2006.01)

(52) U.S. Cl.
CPC ...... *H04L 63/1441* (2013.01); *H04L 63/1425* (2013.01); *H04L 63/1433* (2013.01); *H04L 63/0263* (2013.01)

(58) Field of Classification Search
CPC .................................................. H04L 63/1441
USPC ...................................................... 726/22–25
See application file for complete search history.

(56) References Cited

U.S. PATENT DOCUMENTS

| | | |
|---|---|---|
| 6,721,744 B1 | 4/2004 | Naimark et al. |
| 7,111,325 B2 | 9/2006 | Keohane et al. |
| 7,325,252 B2 | 1/2008 | Bunker et al. |
| 7,526,807 B2 * | 4/2009 | Chao .................. H04L 63/1408 726/23 |
| 7,543,070 B1 | 6/2009 | Watson et al. |
| 7,636,777 B1 | 12/2009 | Harada et al. |
| 7,653,941 B2 | 1/2010 | Gleichauf |
| 7,774,459 B2 | 8/2010 | Wang et al. |
| 7,797,421 B1 | 9/2010 | Scofield et al. |

(Continued)

FOREIGN PATENT DOCUMENTS

| | | |
|---|---|---|
| WO | WO2005112390 | 11/2005 |
| WO | WO2006010381 | 2/2006 |

OTHER PUBLICATIONS

Wikipedia. Man-in-the-middle attack as accessed on Nov. 8, 2012. http://en.wikipedia.org/w/index.php?title=Man-in-the-middleattack&oldid=518960767.

*Primary Examiner* — Jeffery Williams
*Assistant Examiner* — Suman Debnath
(74) *Attorney, Agent, or Firm* — Patterson Thuente Pedersen, P.A.

(57) ABSTRACT

System and method for detecting malicious activity in a computer network that includes hosts and connectors between the hosts. Network pathways to a plurality of investigated hosts are explored. A graph is formed based on results of the exploring of the network pathways. The graph represents topology of explored portions of the computer network, including connectors (e.g., communication links) between the investigated hosts and intermediary hosts situated along explored pathways that include the investigated hosts, and an indication of a prevalence of connectors in pathways to each of the investigated hosts. The prevalence of connectors along pathways to each of the investigated hosts is compared against a threshold, and any suspicious host situated along pathways to a common investigated host that is associated with a connector having a low prevalence that is below the prevalence threshold is identified. An access restriction can be associated with the suspicious host.

23 Claims, 12 Drawing Sheets

(56) References Cited

U.S. PATENT DOCUMENTS

| | | | |
|---|---|---|---|
| 7,873,993 B2 | 1/2011 | King | |
| 7,882,538 B1 | 2/2011 | Palmer | |
| 7,930,256 B2 | 4/2011 | Gonsalves et al. | |
| 7,941,853 B2 | 5/2011 | Rozenberg et al. | |
| 7,958,555 B1 | 6/2011 | Chen et al. | |
| 8,010,469 B2 | 8/2011 | Kapoor et al. | |
| 8,776,229 B1* | 7/2014 | Aziz | H04L 63/1425 713/176 |
| 9,386,030 B2* | 7/2016 | Vashist | H04L 63/1416 |
| 2002/0112076 A1 | 8/2002 | Rueda et al. | |
| 2004/0019781 A1 | 1/2004 | Chari et al. | |
| 2005/0091538 A1 | 4/2005 | Hoche et al. | |
| 2006/0010154 A1 | 5/2006 | Milener et al. | |
| 2006/0206615 A1 | 9/2006 | Zheng et al. | |
| 2007/0106786 A1 | 5/2007 | Gleichauf | |
| 2007/0153763 A1 | 7/2007 | Rampolla et al. | |
| 2007/0192485 A1 | 8/2007 | McMahan et al. | |
| 2007/0198603 A1 | 8/2007 | Tsioutsioulikis et al. | |
| 2007/0209075 A1* | 9/2007 | Coffman | 726/23 |
| 2008/0008202 A1 | 1/2008 | Terrell et al. | |
| 2008/0022389 A1* | 1/2008 | Calcev et al. | 726/14 |
| 2008/0089347 A1 | 4/2008 | Phillipi et al. | |
| 2008/0101234 A1* | 5/2008 | Nakil | H04L 63/1425 370/235 |
| 2008/0127338 A1 | 5/2008 | Cho et al. | |
| 2008/0229415 A1 | 9/2008 | Kapoor et al. | |
| 2008/0244744 A1 | 10/2008 | Thomas et al. | |
| 2008/0320152 A1 | 12/2008 | Padmanabhan et al. | |
| 2009/0097418 A1 | 4/2009 | Castillo et al. | |
| 2009/0113547 A1 | 4/2009 | Higashikado | |
| 2009/0287734 A1 | 11/2009 | Borders | |
| 2010/0100958 A1 | 4/2010 | Jeremiah | |
| 2010/0138925 A1* | 6/2010 | Barai | H04L 63/1433 726/25 |
| 2010/0192024 A1* | 7/2010 | Middleton | G06F 11/0751 714/48 |
| 2010/0235915 A1 | 9/2010 | Memon | |
| 2010/0257592 A1 | 10/2010 | Wang et al. | |
| 2010/0318800 A1 | 12/2010 | Simon et al. | |
| 2011/0214187 A1 | 9/2011 | Wittenstein et al. | |
| 2011/0247045 A1* | 10/2011 | Rajagopal et al. | 726/1 |
| 2013/0036469 A1* | 2/2013 | Worth | 726/23 |
| 2013/0086636 A1* | 4/2013 | Golovanov | 726/3 |
| 2013/0246605 A1* | 9/2013 | Mahadik | H04L 63/1433 709/224 |
| 2013/0298244 A1* | 11/2013 | Kumar | G06F 21/52 726/25 |

\* cited by examiner

SYSTEM AND METHOD FOR RESTRICTING PATHWAYS TO HARMFUL HOSTS IN COMPUTER NETWORKS

FIELD OF THE INVENTION

The invention relates generally to information processing and security and, more particularly, to arranging accessibility restrictions to provide protection against the spread of malicious software via a computer network.

BACKGROUND OF THE INVENTION

Today's computer antivirus industry is faced with constantly-evolving opposition from producers of computer viruses and other such malware. New malware is developed to circumvent protection methods, techniques and systems for detection of malicious programs or hacking activity. Moreover, the protection mechanisms are themselves attacked in order to impede or block their protective functionality.

A "Man in the middle" attack (often abbreviated MITM, MitM, MIM, MiM, sometimes referred to as a bucket brigade attack, or a Janus attack) is a cryptography term describing a situation where the attacker is able to read and arbitrarily modify messages exchanged by communicating parties, and where none of the parties can suspect the offender's presence in the communication channel. See, for example, http://en.wikipedia.org/w/index.php?title=Man-in-the-middle_attack&oldid=518960767, the disclosure of which is incorporated by reference herein.

There are other examples of attacks on computing network resources, such as attacks on the domain name server (DNS) cache. Usually, on a network, a computer uses a DNS server provided by the company or by an Internet service provider (ISP). DNS servers are often installed on corporate networks in order to speed up the transfer of names by caching previously-received responses to requests. An attack on the cache of a DNS server can affect the work of the users of this server, or even the work of the users of other servers linked to the DNS server whose cache is rewritten as a result of a successful attack by an offender.

To perform an attack, the offender uses a vulnerability in the DNS software. If the first DNS server does not check the responses of the second DNS server for correctness in order to make sure the source is trusted (for example, using Domain Name System Security Extensions—DNSSEC), the offender can act as the second DNS server. In this situation, the first DNS server will cache incorrect responses from the offender's DNS server. The first DNS server will locally cache falsified responses and use them to respond to user requests; the users, in turn, will receive falsified responses and IP addresses.

Such attacks can be used to redirect users to a website or to a fake mail service of the attacker's choice. The pages of such websites can contain, for example, network worms or viruses, while a fake mail service can receive mailbox logins and passwords from users and send this account information to the offender. Visitors of such fake websites will not be informed of the falsification and probably will download malicious software. To perform such attacks, the attacker forces the targeted DNS server to make a request on any of the domains for which the attacker's DNS server is a trusted one.

One known approach for dealing with network attacks involves gathering statistics of some network traffic parameters and to detect various known types of attacks such as port scanning Attacks are detected based on network traffic parameter analysis rules and command boxes of network packets. Certain systems of this type use Bayes's networks for early notification on the upcoming attack and for preventive security measures.

Although such an approach is may be able to give early warnings about the beginning of an attack on a network, it involves gathering statistics of actual network usage, which means that the system is capable only of countering known types of attacks or mitigating the consequences of a current attack that is already underway. One drawback in this approach is an inability to respond immediately (i.e. before sufficient statistics are gathered to detect the attack). In the case of an attack intended to steal account information, for example, the attack attempt should ideally be prevented before the actual leak of user account information.

Accordingly, a solution is needed that avoids some of the drawbacks described above, and that is preferably capable of addressing other needs as well.

SUMMARY OF THE INVENTION

One aspect of the invention is directed to an automated computer-implemented method for detecting malicious activity in a computer network that includes hosts (e.g., network nodes) and connectors (e.g., communication channels) between the hosts. The method includes exploring, by a system of at least one computer running under program control, network pathways to a plurality of investigated hosts. A graph is formed based on results of the exploring of the network pathways, with the graph representing topology of explored portions of the computer network, including connectors between the investigated hosts and intermediary hosts situated along explored pathways that include the investigated hosts, as well as an indication of a prevalence of connectors in pathways to each of the investigated hosts.

The prevalence of connectors along pathways to each of the investigated hosts can be based on a frequency of usage of those particular connectors, for example. The prevalence is compared against a prevalence threshold. The prevalence threshold can be based on a statistically typical prevalence among the connectors along at least one pathway.

The method further includes identifying, among the hosts situated along pathways to a common investigated host, any suspicious host that is associated with a connector having a low prevalence that is below the prevalence threshold, and associating, by the system, an access restriction with the suspicious host. The access restriction can result in outright blocking of that suspicious host, for example. In one example embodiment, Applying an access restriction involves providing an update to a protection mechanism (e.g., a network path filtering device, firewall, etc.), the update including a set of the access restrictions associated with the suspicious host, which permits the protection mechanism to institute restrictions that limit access to the suspicious host.

Optionally, exploring the network pathways to the plurality of investigated hosts includes accessing the network from a plurality of diverse network connectivity access points into the computer network.

In a related embodiment, the method further includes re-evaluating, the network pathways to the plurality of investigated hosts, including re-evaluating the prevalence of the connectors associated with the suspicious host; and in response to a determination that the prevalence of the connector of the suspicious host, previously indicated as having a low prevalence, has increased above the prevalence threshold, de-associating the access restriction with the suspicious host.

A related aspect of the invention is directed to a system for detecting malicious activity in a computer network that includes hosts and connectors between the hosts. The system includes computing hardware including at least one processor, non-transitory data storage interfaced with the at least one processor, and input/output facilities including network interfacing facilities. The data storage contains instructions that, when executed, establish a controllable execution environment module implemented in the computing hardware according to the instructions to explore network pathways to a plurality of investigated hosts, and a graphing module implemented in the computing hardware according to the instructions to form a graph based on results of the exploring of the network pathways, the graph representing topology of explored portions of the computer network, including connectors between the investigated hosts and intermediary hosts situated along explored pathways that include the investigated hosts, and an indication of a prevalence of connectors in pathways to each of the investigated hosts. A connector evaluator module implemented in the computing hardware according to the instructions to compare the prevalence of connectors along pathways to each of the investigated hosts against a prevalence threshold, and to identify, among the hosts situated along pathways to a common investigated host, any suspicious host that is associated with a connector having a low prevalence that is below the prevalence threshold. The system further includes a security response module implemented in the computing hardware according to the instructions to associate an access restriction with the suspicious host.

Aspects of the invention advantageously provide a practical solution for the problems outlined above, as well as addressing a number of other shortcomings of conventional approaches to dealing with MiM attacks, phishing/pharming attacks, and other techniques employed to capture confidential information or to disseminate malicious content using computer networks.

BRIEF DESCRIPTION OF THE DRAWINGS

The invention may be more completely understood in consideration of the following detailed description of various embodiments of the invention in connection with the accompanying drawings, in which.

Figure 1A:
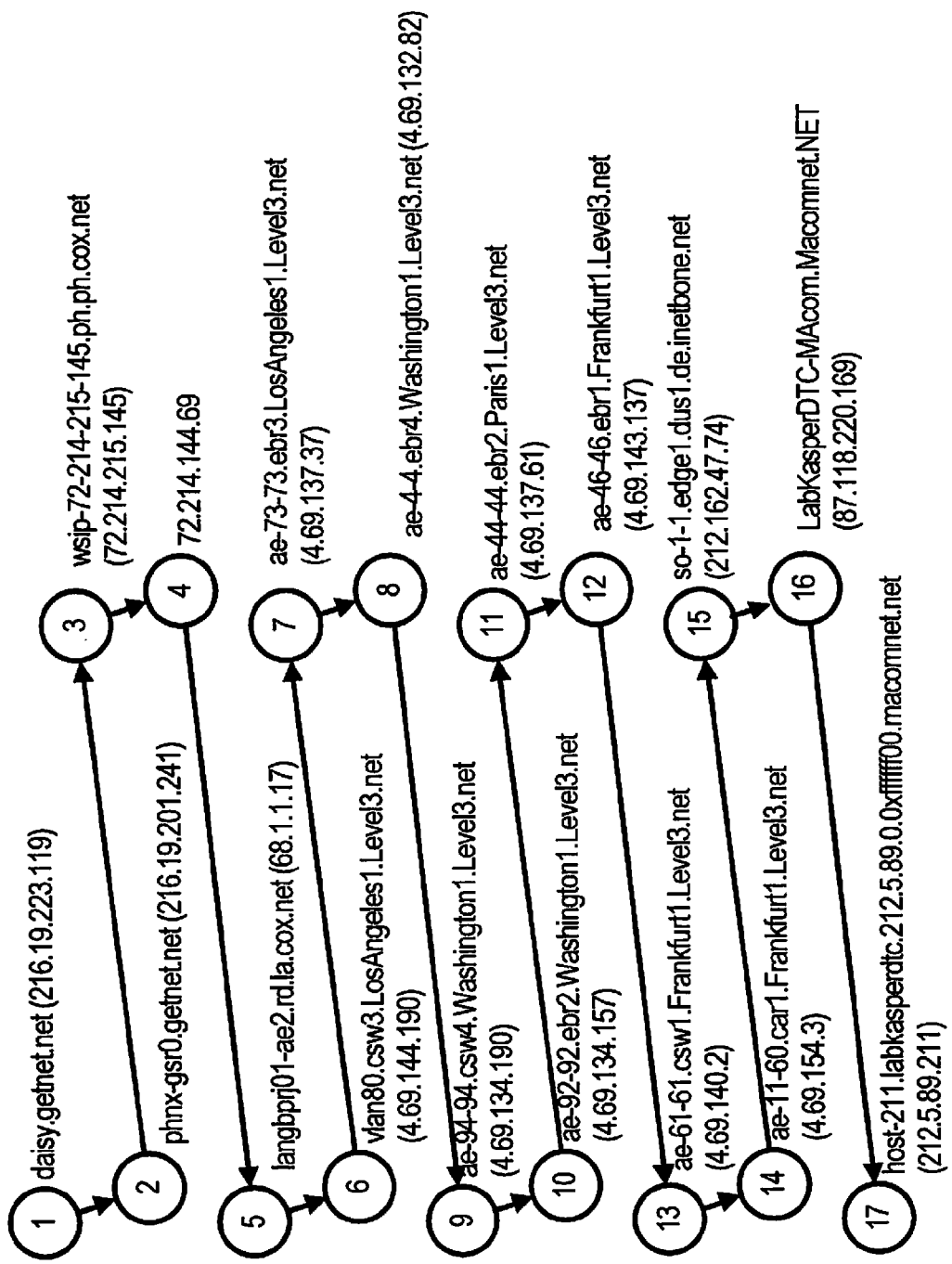
FIG. 1A is a diagram illustrating an exemplary process of exploring pathways and recording connectors to the Website www.kaspersky.com from San Diego, Calif. according to one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERRED EMBODIMENTS

Aspects of the present invention are directed to technologies for detecting computer network intermediary hosts, through which trusted hosts are accessed. If deemed appropriate for the sake of increasing safety of a protected user, computer system, or subnet, according to various embodiments, the intermediary hosts are restricted, e.g., blocked, from being accessed. This is achieved according to certain embodiments by examining the links between network hosts, building a graph of links between network hosts, and automatically analyzing the changes in the links between the hosts, with detection and restriction of the intermediary host's address.

Computer systems controlled by an offender are a system of computer networks, computers, subsystems, objects and tools that have been compromised by an offender and put to malicious use by the offender. In the present context, this term includes primarily a set of servers and other hosts which have a network interface and are used by offenders for illegal, or other malicious actions. Detection of the hosts that are intermediary to the hosts controlled by the offender involves detection of the address of the network interface for the resources controlled by the offender. This address, which is used to access the network and to perform the offender's tasks, is restricted, e.g., blocked, which prevents realization of the malicious functionality.

Accordingly, one aspect of the invention involves gathering initial data to analyze network hosts and the network topology. In one type of embodiment, completeness of the network topology research is achieved by using various sources of information, which have a network access point through various providers in various countries with various users, in physically or logically separated parts on the network. Since the network routing information is dynamic, i.e. it changes constantly, it is desirable to have sources of information in all networks connected to the Internet. Such sources of initial information for analysis can be controlled execution environments, such as virtual machines (similar to virtual bait, see U.S. Pat. No. 7,774,459, the disclosure of which is incorporated by reference herein); specialized agents on user computers (which perform preliminary checks of network hosts at the user's request); firewalls (devices protecting networks from unlawful actions, undesirable traffic, etc). These tools are able to detect malicious software and have access to the addresses of the senders and receivers of network packets, which allows to gather additional information on the source of the spread of undesirable or malicious software; for example, to record the traffic path when establishing connection with the host using the uniform resource locator (URL) address, or to find information on the network node address's owner in the domain registry. For the purpose of analysis in a central server, the said information is gathered using service network protocols, for example, ICMP (inter-network control messages protocol). When connection is established with a trusted node using the URL address, the information on the trusted node is written into a table containing at least the following: the node's domain name; the IP addresses matching the domain name; the e-mail addresses for which the domain is registered, according to the domain registry; the traffic path.

The information gathered on the trusted network nodes is used to build graphs of data transfer and of links between the hosts on the network, i.e. between the user's computer and a trusted resource. The graphs are analyzed using heuristic algorithms, and the connectors, e.g., communication channels, used between network hosts are identified.

The graph include addresses of intermediary hosts situated along the various pathways. The connectors between the hosts are associated with a prevalence value that represents the intensity, e.g., frequency of use, of the channel to transmit traffic from a trusted host.

Automatic access restriction is applied to the hosts which are linked to a trusted network node but whose prevalence in the path of connectors is not typical among others that provide access to that trusted host from the network segment to which the protected user's computer is connected. Accordingly, the restriction is applied to the intermediary hosts on the network that correspond to connectors having a prevalence value which is less than the prevalence values the connectors used previously to transfer data to and from the trusted host.

In a related approach, a list of known URL addresses of trusted resources owned by reputable companies (sites of banks, social networks, online game sites and other resources, which themselves are exposed to the risk of theft of user account information) is sent to the input of a controlled execution environment. In a normal operation mode of a computer network, the access path from the same subnet to a trusted resource matches a predefined path. I.e., it matches a path assigned in routing tables between networks connected through routers and as a result of the functioning of the routing protocols. An intrusion by an offender intending to redirect the flow of information and to gain access to personal user account information results in single changes of the traffic path only in one user or a group of users who use a compromised DNS server. Therefore, a segment of the traffic path is detected that is different from the similar path of most users of the trusted resource.

To prevent this type of attacks, one approach detects in advance the objects that represent malicious intermediary hosts on the network. This will detect the addresses of the hosts presenting an information security threat in advance and place them in an anti-phishing database.

According to one type of embodiment, controlled program execution environments are mobilized for gathering network topology data about hosts and the connectors therebetween, from which the graph can be built. In one such embodiment, a controlled execution environment is implemented as a virtual machine with an installed operating system (OS), a safe execution environment ("sandbox"), an emulator or any other execution environment that gathers information on the actions performed by an application on a computer. Though some of the embodiments detailed hereinbelow are described in the context of a virtual machine implementation, it will be understood that any suitable controllable execution environment can be utilized according to various embodiments of the invention.

The data collected about the network hosts are used to build a one or more models, referred to herein as graphs, of relationships between hosts. In one type of embodiment, graphs can include information representing the topology of explored portions of the network, determinations of which hosts in the network have malicious content, and which of the pathways have the most prevalent association with the malicious host(s).

In one type of embodiment, each of the controlled execution environments is implemented as a virtual machine. To detect malicious nodes, the virtual machine lacks certain security features that would otherwise protect the virtual machine from malware. A list of URL addresses to be examined is sent to the virtual machine's input. The list of URL addresses to be examined can be composed of the most often-visited WebPages representing popular services, such as email, a social network, web blogs, etc. Another way to receive lists of URL addresses for examination is to receive incremental updates in the lists of registered domain addresses from the main registrars (reg.ru, verisigninc.com, etc.), or information on suspicious visited pages from the (Web Toolbar) antivirus security component of the antivirus product. Optionally, the link verification module is controlled by a Web antivirus included in the antivirus product. In this embodiment, the controlled execution environment's task is to check all links on the web page for relation to suspicious or malicious web addresses. Using a web browser, all sites are successively loaded in the virtual machine from the list of URL addresses for examination.

Based on the results of the examination of the list of URL addresses, a URL examination results table is built, containing, in addition to the examined URL addresses, the URL addresses from the references in the materials of the original website (see Table 1 below). Each record includes at least the following: the host's domain name on the network; the IP addresses corresponding to the domain name and received using a name server search; information on the e-mail address of the domain's owner, as per the registration record in the domain registry; and the IP addresses of the intermediary hosts along the path of the network data to the website at the URL. The above information is gathered either directly by the virtual machine, or by separate research modules using publicly accessible services nslookup and WHOIS. The name server information is accessed using the nslookup utility ("name server lookup", a utility providing the user with the command line interface to access the DNS system). The e-mail address of the domain's owner is obtained using the WHOIS service, an applied-level network protocol based on a TCP protocol (Port 43), which is used to obtain registration information on the domain name, the IP address and autonomous system owners. The IP addresses of the intermediary hosts on the data path on the network to the website at the URL are obtained using tracert or traceroute utilities.

TABLE 1

| # | Domain Name | IP address | Owner's e-mail address | Traceroute Path |
|---|---|---|---|---|
| 1 | Kaspersky.ru | 212.5.89.211 | webmaster@avp.ru<br>sales@kaspersky.com<br>rudomen@kaspersky.com | 216.19.223.119<br>216.19.201.241<br>72.214.215.145<br>72.214.144.69<br>68.1.1.17<br>4.69.144.190, 4.69.144.62,<br>4.69.144.190<br>4.69.137.37, 4.69.137.33<br>4.69.132.82<br>4.69.134.190<br>4.69.134.157, 4.69.134.149,<br>4.69.134.145<br>4.69.137.61, 4.69.137.53, 4.69.137.57<br>4.69.143.145, 4.69.143.137,<br>4.69.143.141<br>4.69.140.14, 4.69.140.2, 4.69.140.14<br>4.69.154.3<br>212.162.47.74<br>87.118.220.169<br>212.5.89.211 |
| 2 | ... | ... | ... | ... |

Traceroute is a computer utility based on an ICMP protocol designed to identify data paths in TCP/IP networks. The traceroute program sends data to a specified network host, showing information on all intermediary routers through which the data passed on the way to the target host. In case of problems with data delivery to any host, the program allows the requestor to find the network segment where problems arose. FIG. 1A and Table 2 exemplify the results of the determination of the path from the U.S.A. (the getnet.com website) to the www.kaspersky.ru website at the address 212.5.89.211.

TABLE 2 http://www.getnet.com/cgi-bin/trace?kaspersky.ru
No traceroute to kaspersky.ru (212.5.89.211), 30 hops max, 40 byte packets 1 daisy.getnet.net (216.19.223.119) 0.057 ms 0.012 ms 0.012 ms
2 phnx-gsr0.getnet.net (216.19.201.241) 0.355 ms 0.426 ms 0.412 ms
3 wsip-72-214-215-145.ph.ph.cox.net (72.214.215.145) 1.520 ms 1.561 ms 1.547 ms
4 72.214.144.69 (72.214.144.69) 3.280 ms 3.268 ms 3.255 ms
5 langbprj01-ae2.rd.la.cox.net (68.1.1.17) 15.214 ms 18.594 ms 15.462 ms
6 vlan80.csw3.LosAngeles1.Level3.net (4.69.144.190) 15.603 ms
  vlan60.csw1.LosAngeles1.Level3.net (4.69.144.62) 16.758 ms
  vlan80.csw3.LosAngeles1.Level3.net (4.69.144.190) 16.730 ms
7 ae-73-73.ebr3.LosAngeles1.Level3.net (4.69.137.37) 16.705 ms ae-63-
  63.ebr3.LosAngeles1.Level3.net (4.69.137.33) 14.834 ms 14.853 ms
8 ae-4-4.ebr4.Washington1.Level3.net (4.69.132.82) 79.060 ms 79.369 ms 79.489 ms
9 ae-94-94.csw4.Washington1.Level3.net (4.69.134.190) 79.465 ms 79.173 ms 79.323 ms
10 ae-92-92.ebr2.Washington1.Level3.net (4.69.134.157) 79.299 ms ae-72-
   72.ebr2.Washington1.Level3.net (4.69.134.149) 80.933 ms ae-62-
   62.ebr2.Washington1.Level3.net (4.69.134.145) 80.236 ms
11 ae-44-44.ebr2.Paris1.Level3.net (4.69.137.61) 162.793 ms ae-42-
   42.ebr2.Paris1.Level3.net (4.69.137.53) 160.828 ms ae-43-43.ebr2.Paris1.Level3.net
   (4.69.137.57) 160.342 ms
12 ae-48-48.ebr1.Frankfurt1.Level3.net (4.69.143.145) 170.442 ms ae-46-
   46.ebr1.Frankfurt1.Level3.net (4.69.143.137) 169.817 ms ae-47-
   47.ebr1.Frankfurt1.Level3.net (4.69.143.141) 166.476 ms
13 ae-91-91.csw4.Frankfurt1.Level3.net (4.69.140.14) 167.105 ms ae-61-
   61.csw1.Frankfurt1.Level3.net (4.69.140.2) 166.605 ms ae-91-
   91.csw4.Frankfurt1.Level3.net (4.69.140.14) 165.362 ms
14 * ae-11-60.car1.Frankfurt1.Level3.net (4.69.154.3) 165.977 ms 165.140 ms
15 so-1-1.edge1.dus1.de.inetbone.net (212.162.47.74) 204.774 ms 204.959 ms 206.729 ms
16 LabKasperDTC-MAcom.Macomnet.NET (87.118.220.169) 203.215 ms 203.734 ms
   203.958 ms
17 host-211.labkasperdtc.212.5.89.0.0xffffff00.macomnet.net (212.5.89.211)

Figure 1B:
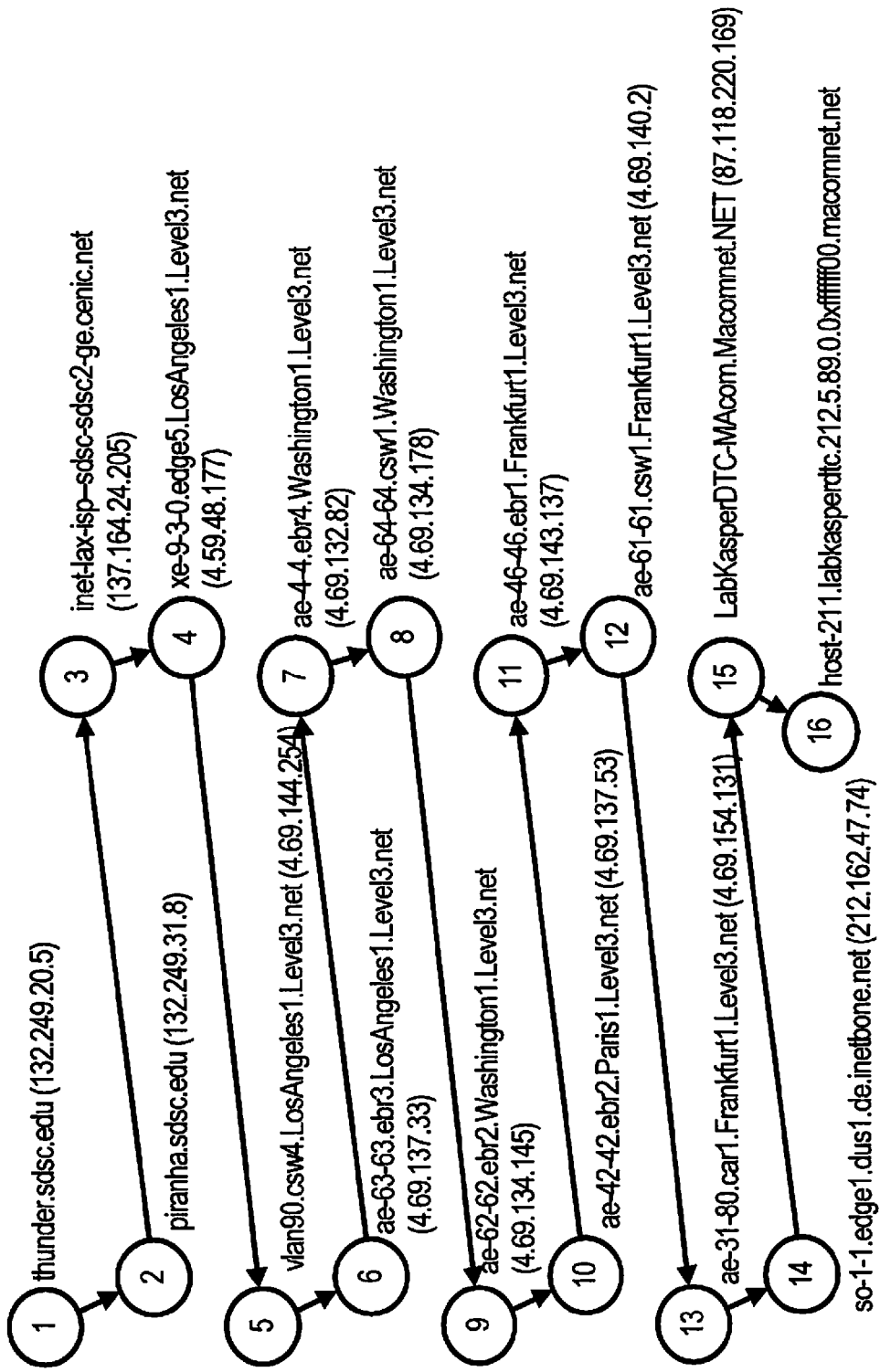
FIG. 1B is a diagram similar to FIG. 1A, except that the starting point is Phoenix, Ariz. according to one embodiment of the invention.

As per FIG. 1B and Table 3, all intermediary hosts from the sdsc.edu website to the www.kaspersky.ru website successfully responded to the request. At iteration 16, a response was received from a host with the following IP address: 212.5.89.211.

TABLE 3 http://www.getnet.com/cgi-bin/trace?kaspersky.ru
traceroute: Warning: Multiple interfaces found; using 132.249.21.58 @ bge0:1
No traceroute to KASPERSKY.RU (212.5.89.211), 30 hops max, 40 byte packets 1 thunder.sdsc.edu (132.249.20.5) 0.430 ms 0.275 ms 0.236 ms
2 piranha.sdsc.edu (132.249.31.8) 31.934 ms 0.232 ms 0.239 ms
3 inet-lax-isp--sdsc-sdsc2-ge.cenic.net (137.164.24.205) 4.105 ms 4.002 ms 4.112 ms
4 xe-9-3-0.edge5.LosAngeles1.Level3.net (4.59.48.177) 4.228 ms 4.134 ms 4.108 ms
5 vlan90.csw4.LosAngeles1.Level3.net (4.69.144.254) 4.605 ms
  vlan80.csw3.LosAngeles1.Level3.net (4.69.144.190) 4.133 ms 4.632 ms
6 ae-63-63.ebr3.LosAngeles1.Level3.net (4.69.137.33) 4.104 ms ae-83-
  83.ebr3.LosAngeles1.Level3.net (4.69.137.41) 6.007 ms ae-73-
  73.ebr3.LosAngeles1.Level3.net (4.69.137.37) 4.138 ms
7 ae-4-4.ebr4.Washington1.Level3.net (4.69.132.82) 74.272 ms 72.029 ms 72.249 ms
8 ae-64-64.csw1.Washington1.Level3.net (4.69.134.178) 68.389 ms 68.264 ms 68.284 ms
9 ae-62-62.ebr2.Washington1.Level3.net (4.69.134.145) 68.371 ms 68.371 ms 70.010 ms
10 ae-42-42.ebr2.Paris1.Level3.net (4.69.137.53) 147.624 ms ae-44-
   44.ebr2.Paris1.Level3.net (4.69.137.61) 150.278 ms ae-42-42.ebr2.Paris1.Level3.net
   (4.69.137.53) 149.002 ms
11 ae-46-46.ebr1.Frankfurt1.Level3.net (4.69.143.137) 155.331 ms 155.219 ms 155.230 ms
12 ae-71-71.csw2.Frankfurt1.Level3.net (4.69.140.6) 156.483 ms ae-61-
   61.csw1.Frankfurt1.Level3.net (4.69.140.2) 156.481 ms ae-71-
   71.csw2.Frankfurt1.Level3.net (4.69.140.6) 156.561 ms
13 ae-31-80.car1.Frankfurt1.Level3.net (4.69.154.131) 321.462 ms 236.581 ms 159.171 ms
14 so-1-1.edge1.dus1.de.inetbone.net (212.162.47.74) 201.285 ms 201.619 ms 200.412 ms
15 LabKasperDTC-MAcom.Macomnet.NET (87.118.220.169) 198.669 ms 199.889 ms 199.792 ms
16 host-211.labkasperdtc.212.5.89.0.0xffffff00.macomnet.net In another approach for building the URL examination results table, specialized agents in the form of relevant program modules (for example, a link verification program module made as a Web Toolbar) on user computers, which perform preliminary check of the network hosts at the user's request, are used as the controlled execution environment. This is an example of a non-virtual machine embodiment, where the controlled execution environments are actual computer systems running real operating systems. In this case, the path data, the domain name and the network host's IP address are sent to the URL examination results table stored on the central server. Specialized agents receive information required to fill out the URL examination results table, which is compiled by the central server similarly to the process described above.

Figure 2:
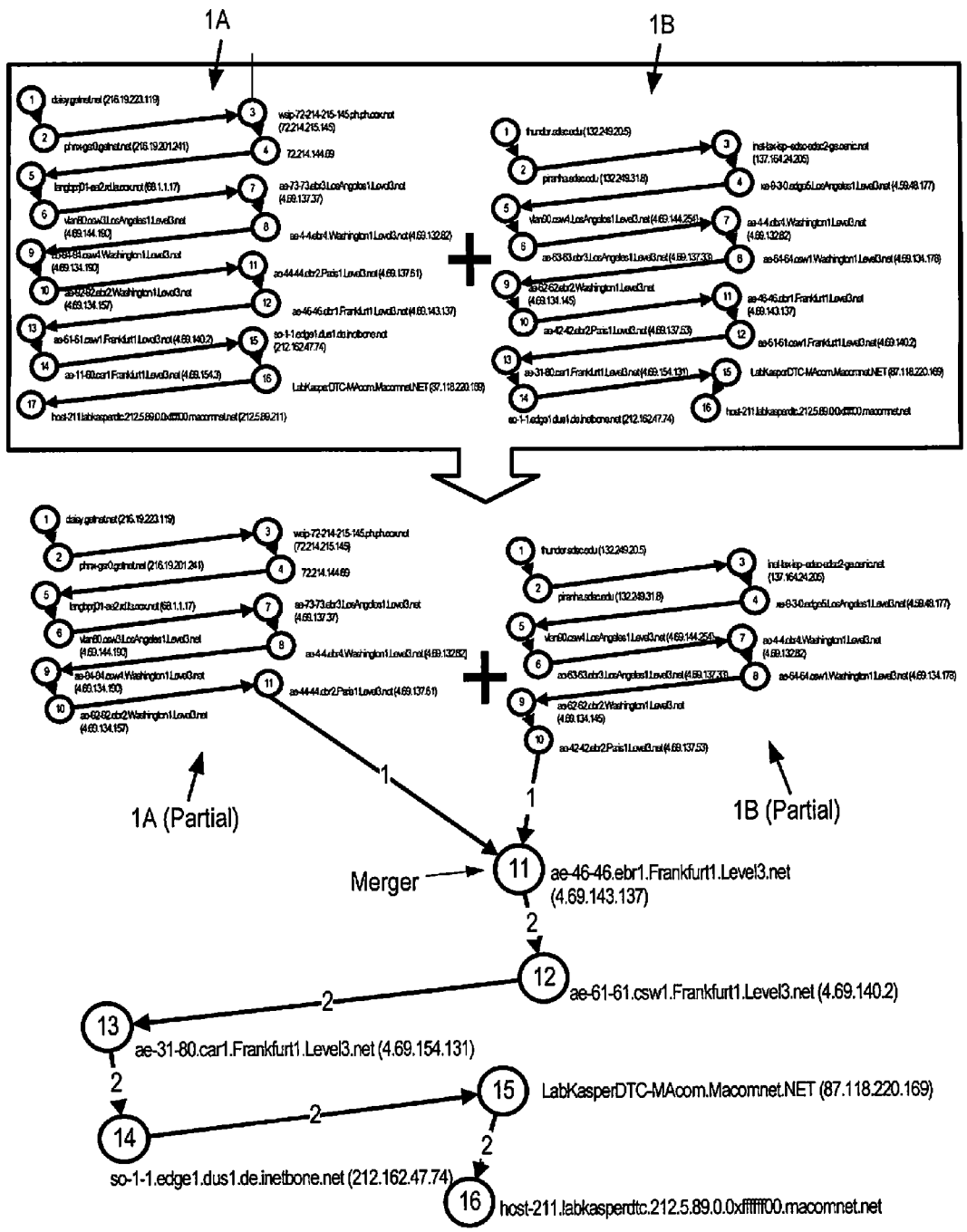
FIG. 2 is a diagram illustrating an exemplary process of combining the paths recorded according to the processes of FIGS. 1A and 1B into a graph, which may be utilized to analyze the number of detected instances of malicious changes of traffic paths on a computer network according to one embodiment of the invention.

Information on the traffic paths from one of the trusted network hosts to several user computers is combined, and a graph with weighted connectors is built. An example of combining and assigning weights to connectors is illustrated in FIG. 2. The paths of FIG. 1A and FIG. 1B, indicated respectively as 1A and 1B in FIG. 2, are merged when there are common connectors. As illustrated, portions of the paths 1A (Partial) and 1B (Partial) are left with a weight of 1, but after the merger point (indicated as Merger in FIG. 2), the merged path consists of connectors having a weight that is summed to 2. The weight of each connector represents the prevalence of that connector, i.e., the extent of usage of that connector for accessing a known trusted resource, such as the trusted resource. In one type of embodiment, the prevalence represents the number of times that a connector was used to access the trusted resource during a monitoring period. In another embodiment, information on the detected malicious WebPages is gathered using a firewall. In this case, information on the malicious WebPages, the domain name and the IP address of the network host containing malicious software are sent to the URL examination results table stored on a central server. The missing information required to fill in the URL examination results table is gathered by a central server, similarly to the process described above. The information gathered in this manner for the URL examination results table will correspond to the actual network architecture.

Below is a sample view of the registration information of the www.kaspersky.ru domain name's owner as per the WHOIS database:

http://www.db.ripe.net/whois?form_type=simple&full_query_string=&searchtext=212.5.89.211&do_search=Search
This is the RIPE Database search service.
The objects are in RPSL format.
The RIPE Database is subject to Terms and Conditions.
See http://www.ripe.net/db/support/db-terms-conditions.pdf
inetnum: 212.5.89.0-212.5.89.255
netname: AVP-NET-COLO-via-MAcom
descr: Kaspersky Lab
country: RU
admin-c: SF1624-RIPE
tech-c: SF1624-RIPE
status: ASSIGNED PA
mnt-by: MACOMNET-MNT
source: RIPE #Filtered
person: Sergey Fomin
address: System Administrator/Kaspersky Lab Ltd
address: 10, Geroyev Panfilovtsev Str.,
address: 123363, Moscow, Russia
phone: +7 495 797 87 00
phone: +7 495 797 87 07
fax-no: +7 495 797 87 00
nic-hdl: SF1624-RIPE
abuse-mailbox: abuse@kaspersky.com
mnt-by: MACOMNET-MNT
source: RIPE #Filtered
route: 212.5.64.0/18
descr: MAcomnet Telco,
descr: Kapelskiy pereulok, d. 8, str. 1, descr: Moscow, 129110, Russia
origin: AS8470
mnt-by: MACOMNET-MNT
source: RIPE #Filtered This example shows the registration information of the www.kaspersky.com domain name's owner. The relevant field shows the e-mail, abuse@kaspersky.com. Originally, the WHOIS system was created in order to allow system administrators to find contact information of other administrators of IP addresses or domain names.

Next, the information from the URL examination results table is analyzed and a graph is built. In one embodiment, the actual structure of the information channels between network hosts is represented and is built in accordance with the traces of network data paths. The IP addresses of the intermediary hosts on the network data path to a trusted host at the specified URL, obtained using tracert or traceroute utilities, are placed in the graph. The connectors between the hosts represent the presence of a communication channel between the relevant hosts, while the connector weight represents the prevalence, e.g., frequency of the use of the communication channel for information transfer. The prevalence of a communication channel reflects how often the communication channel is used to access the trusted host. The connector weight can be expressed by a relative value as a percentage, or by an absolute value, i.e. how many times the communication channel was used to access the trusted host. An example of such graph is shown in FIG. 3 (the connector weight corresponds to the number of recorded instances when the communication channel was used to access the trusted host).

Figure 3:
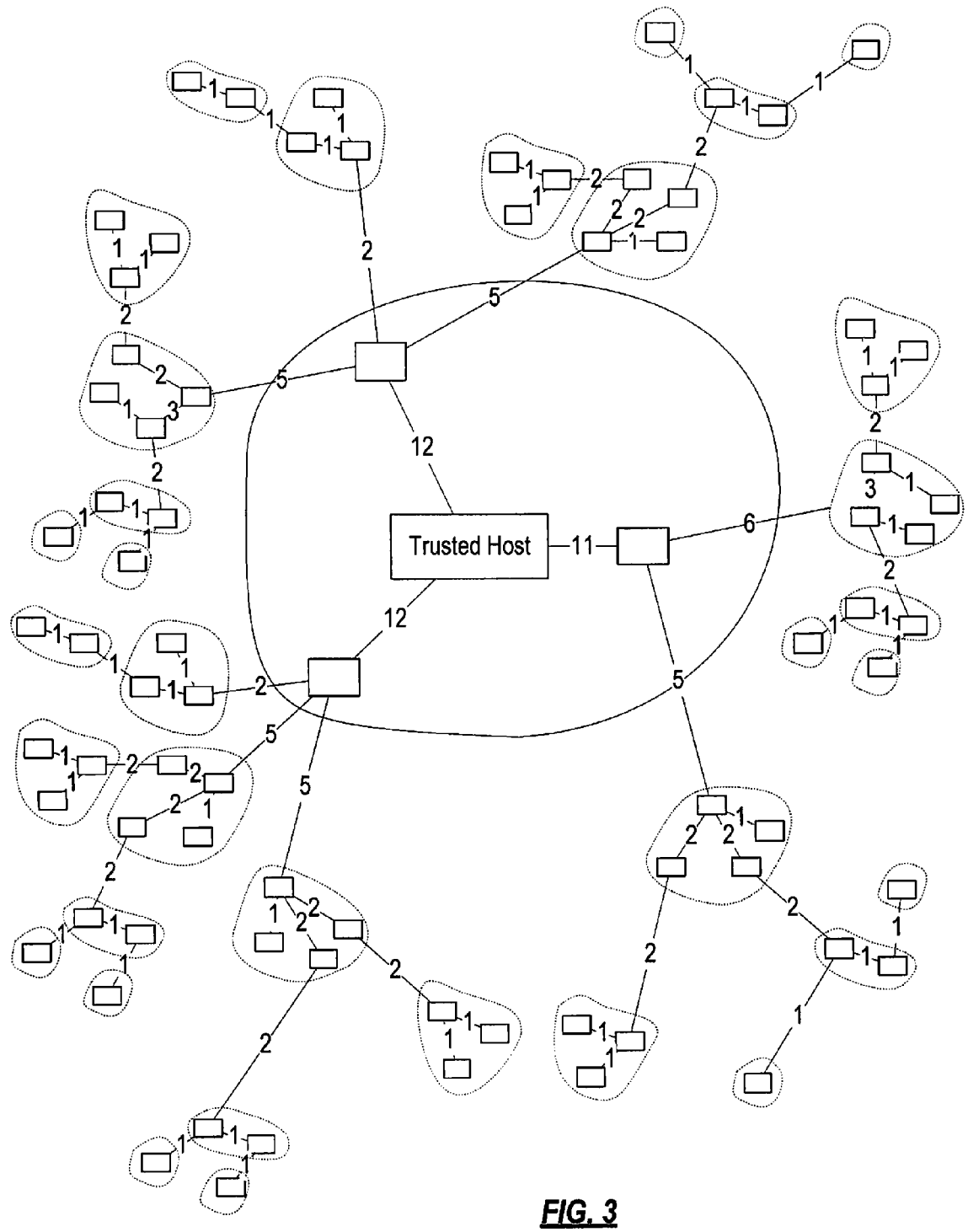
FIG. 3 illustrates an example of a graph built according to one embodiment from paths where the connectors represent communication channels.

FIG. 3 is a diagram depicting the operation of a portion of a global computer network. The diagram shows a trusted host and many client computers that access the trusted host through communication channels and intermediary hosts. The graph's connectors represent the communication channels and have a weight which corresponds to the number of times the communication channels were used to access the trusted host.

Figure 4:
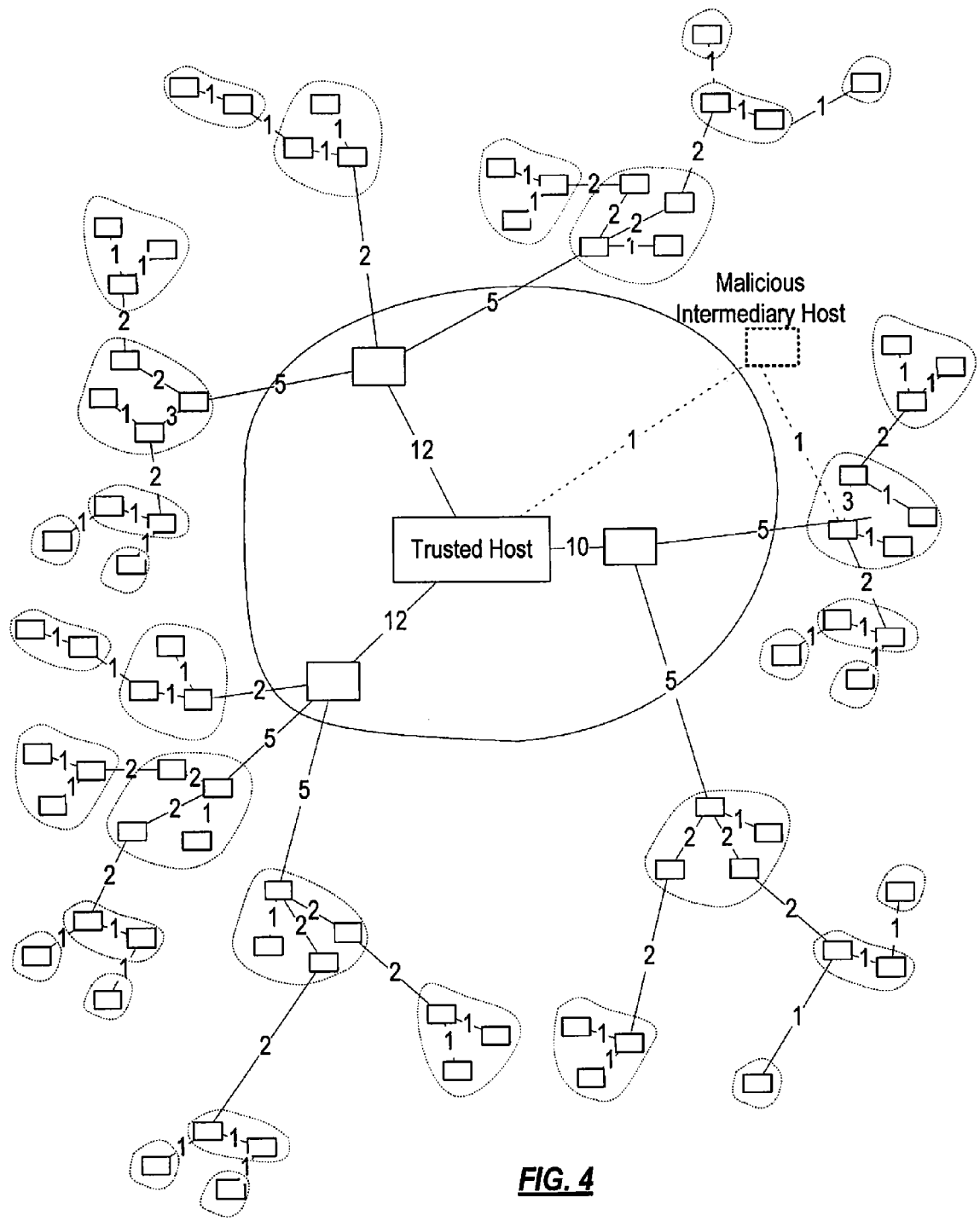
FIG. 4 illustrates an example of a graph built according to one embodiment from paths where the connectors represent communication channels and where abnormal deviations in the traffic path to the trusted host are detected.

FIG. 4 schematically illustrates a similar graph, where the dotted lines represent communication channels and an intermediary host used to intercept user data from the relevant network. This scheme allows the offender to gain access to the transferred data of all the users of a subnet, which, in this case, sends traffic to the global network through the intermediary host. The offender's goal may be to steal account information for such services as email, a social network, financial services (for example, web banking), or to obtain any other valuable information.

In a practical realization, the system and method of the invention are implemented, and carried out, respectively, using computer machinery. The computer-implemented system can be implemented in one physical machine, or can be distributed among multiple physical machines, such as by role or function, or by process thread in the case of a cloud computing distributed model. In various embodiments, aspects of the invention can be configured to run in virtual machines that in turn are executed on one or more physical machines. It will be understood by persons of skill in the art that features of the invention may be realized by a variety of different suitable machine implementations.

For illustration purposes, a visual example of such a graph according to one embodiment is in the form of a network map, as depicted in FIGS. 3-4. In practice, non-visual representations of the graph are utilized according to various embodiments. A variety of different data structures can be used to store a representation of the graph in a computer-readable storage medium such as a memory device or disk. For instance: network tree structures, an adjacency list or matrix, or an incidence list or matrix, or any combination thereof. Any one (or more) of a variety of suitable data structures, either currently known or later developed, are contemplated as being within the spirit of the invention.

Figure 5A:
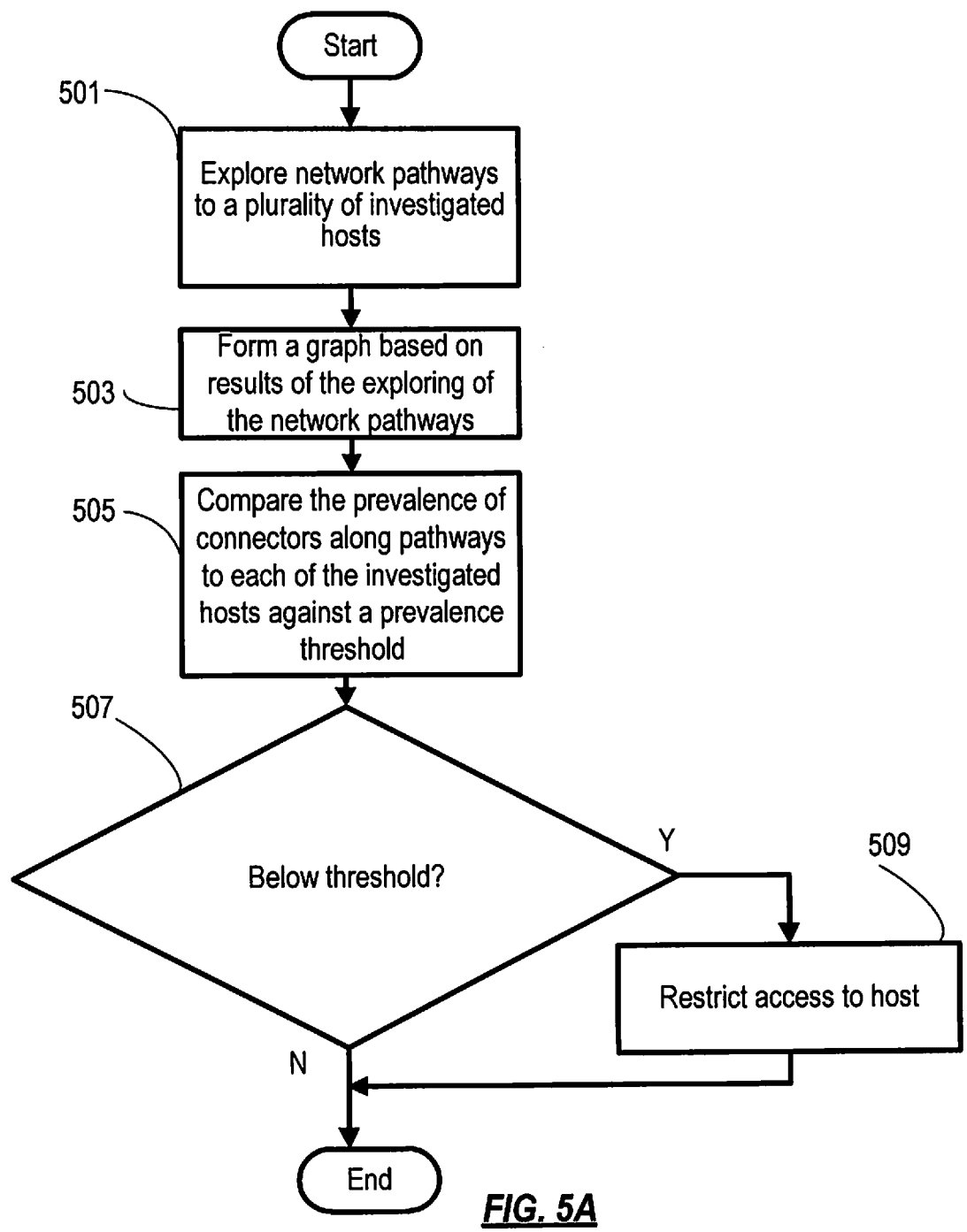
FIG. 5A illustrates a process of detecting malicious activity in a computer network based on suspicious non-typical usage of certain connectors in pathways according to one embodiment.

FIG. 5A illustrates an automated computer-implemented method for detecting malicious activity in a computer network according to one embodiment. At 501, a system of at least one computer running under program control explores network pathways to a plurality of investigated hosts. At 503 a graph is formed based on results of the exploring of the network pathways. The graph represents the topology of explored portions of the computer network, including connectors between the investigated hosts and intermediary hosts situated along explored pathways that include the investigated hosts. Also, the graph indicates a prevalence of connectors in pathways to each of the investigated hosts. At 505, the prevalence of connectors along pathways to each of the investigated hosts is compared against a prevalence threshold. At 507 a decision is made as to whether the threshold is not met. This is indicative a suspicious host. At 509, an access restriction is associated with the suspicious host.

Figure 5B:
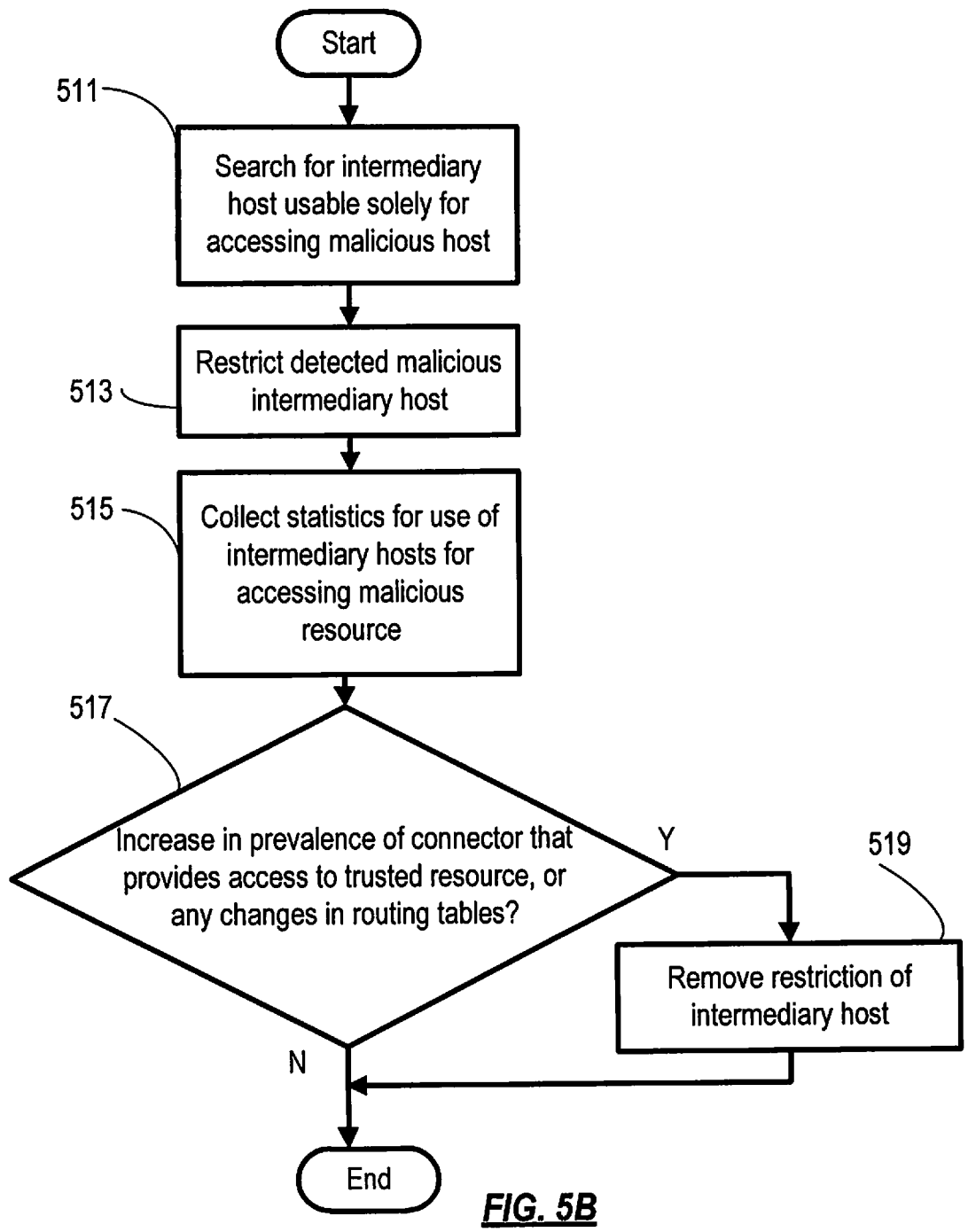
FIG. 5B illustrates a process of blocking and un-blocking intermediary hosts according to one embodiment.

FIG. 5B illustrates an exemplary process of blocking and un-blocking intermediary hosts according to one embodiment. At 511, it is determined if a known trusted host is accessed through an intermediary host in a single instance. In this case, the intermediary host is blocked at 513. In case of blockage, the intermediary host's address is entered in a malicious host database; consequently, all computer security solutions users receive information on such host. All traffic sent to the hosts' addresses specified in the malicious host database is blocked by all active security subsystems—the intrusion prevention system, the filter for paths to network objects (blocks access to resources using the mask assigned in the malicious host database) and by the filter for network resource addresses (which blocks access to a network host when the formalized address of a network resource matches the record in the malicious host database).

The building of the graph continues at 515, where statistics of intensity of the use, of the intermediary hosts continue to be gathered. If the results of the statistics gathering show that the level of intensity of the use of the communication channel to access the trusted resource increases, as determined at 517, or changes occurred in the routing tables, then the intermediary host used to access the trusted host is unblocked at 519. In on embodiment, an unblocking threshold of 10% of the number of connections established from the relevant subnet can be an example of threshold intensity level of the use of a communication channel for unblocking. This situation corresponds to a legitimate change of the path for access to a trusted host in case if the owner of that resource did change the address. In one embodiment, the statistics used to assess the intensity of the use of a communication channel are selected using a "sliding window" principle, which limits the time period when the communication channel was used to access the trusted host.

In one embodiment, blockage of all addresses from the malicious host database is performed using a path filter. The path filter checks the addresses of the hosts to which a request is sent through the network or from which a response came from the network, i.e. it compares the host's address with the information in the malicious host database. When addresses match, communication is blocked with each address specified in the malicious host database.

Figure 6:
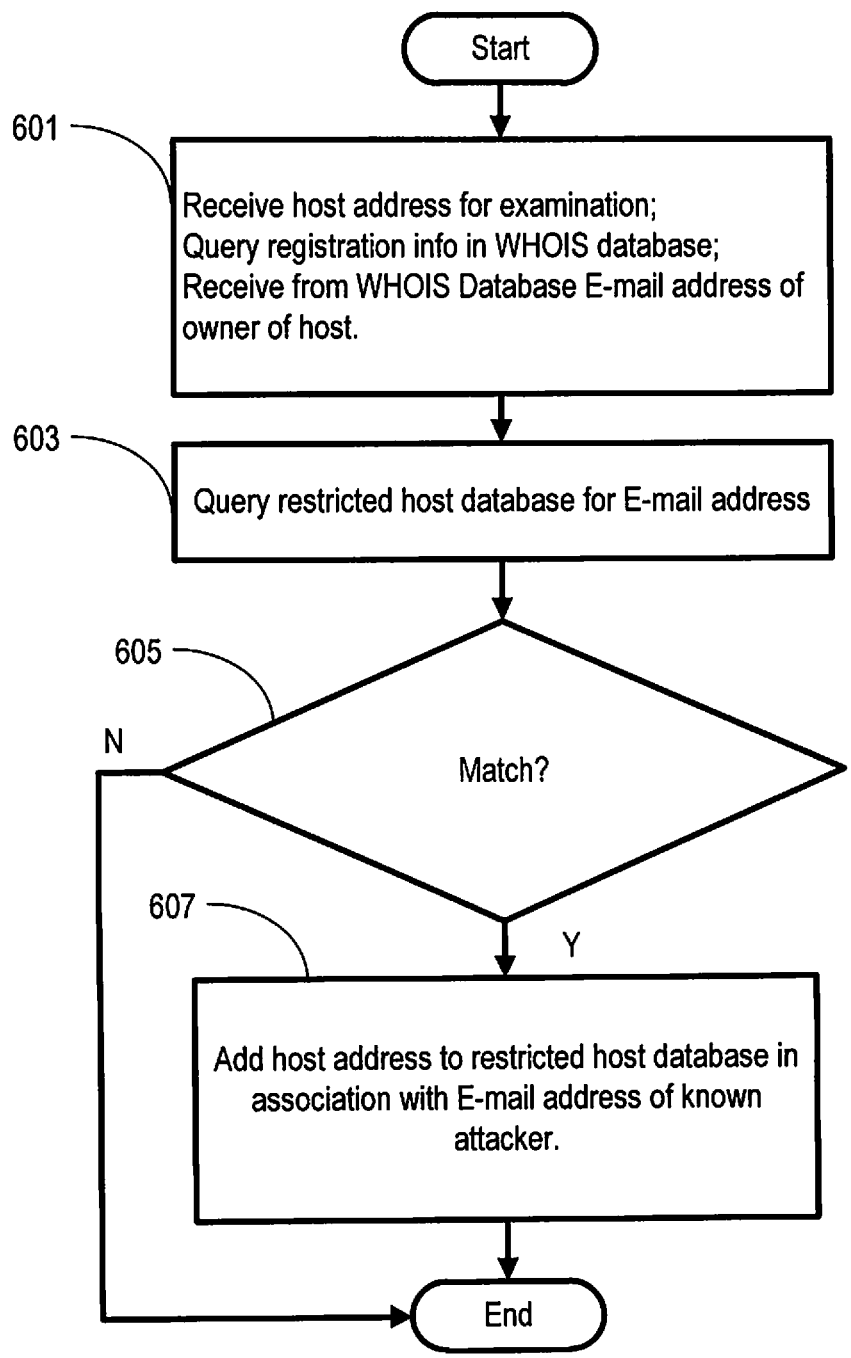
FIG. 6 illustrates a process of verification according to one embodiment of whether a host belongs to an offender, using registration information used by the offender to register the domain.

In one embodiment, adding host addresses to the malicious host database, with subsequent blockage of access to hosts by a path filter, includes analysis of the registration information on all hosts. FIG. 6 is a flow diagram illustrating a process of verification of whether a host belongs to an offender, using registration information used by the offender to register the domain according to one embodiment. At 601, the registration information is obtained using the WHOIS service and saved in the URL examination results table, contains a reference to the domain owner's email address. Since the email address is used by the owner for correspondence with the provider and for control of a network host or a set of network hosts, such email address can be an indicator of an offender and can be used to detect resources controlled by that offender. At the initial stage of the research, after building a graph traversal through the links and automatic redirections, it is appropriate to check whether the owner's email address is specified in the malicious host database at 603. If there is a match at 605, the malicious host database is supplemented with the newly detected address of the malicious network host at 607.

Figure 7:
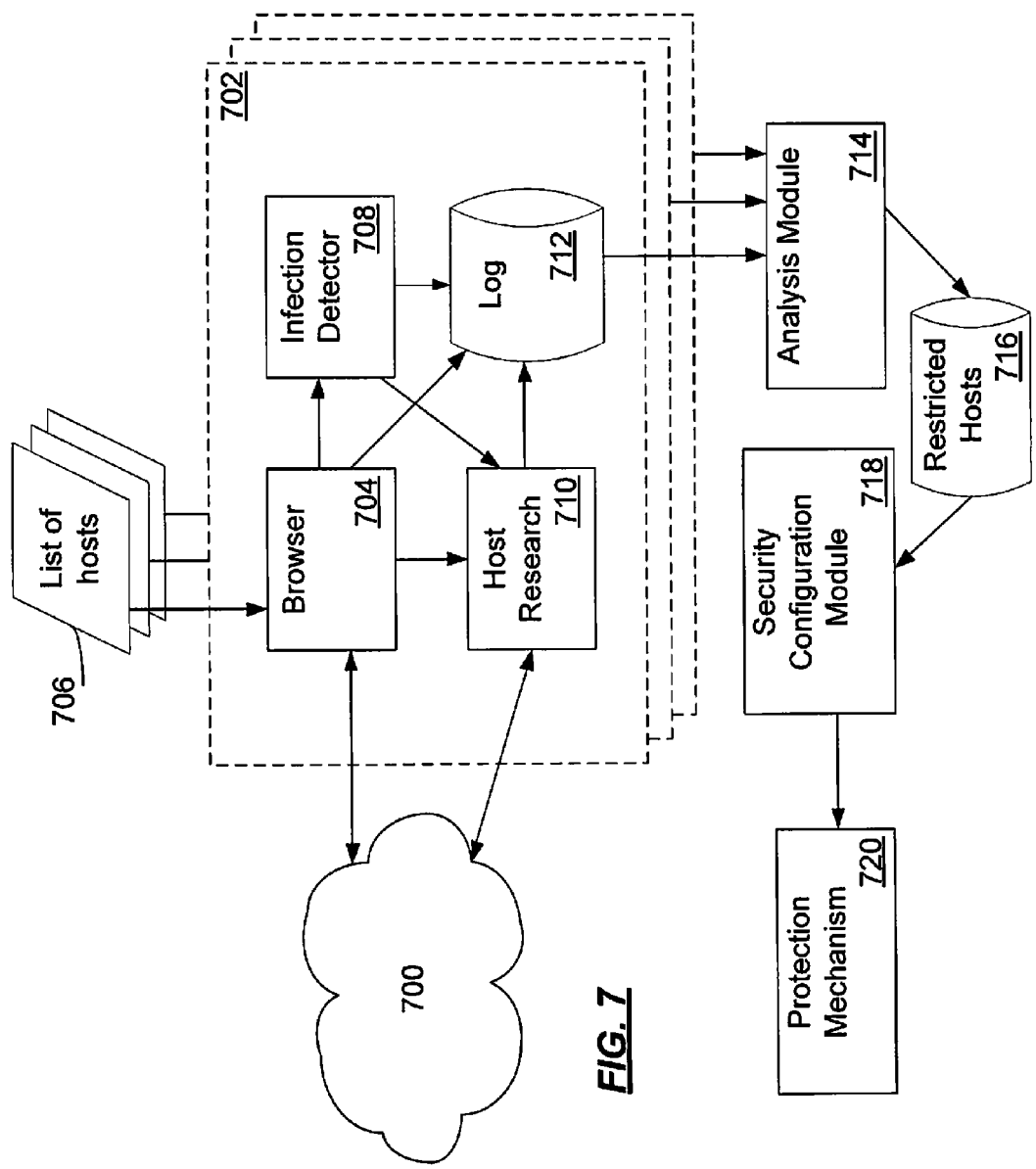
FIG. 7 is a block diagram illustrating functional modules of a system for analyzing a network and protecting a client from accessing malicious content on the network according to one embodiment.

FIG. 7 is a block diagram illustrating functional modules of a system for analyzing a network 700 and protecting a client from accessing malicious content on the network according to one embodiment. In this embodiment, the data gathering system is implemented as a plurality of virtual machines 702 are utilized to gather information about the network topology and sources of malware distribution. Each virtual machine 702 implements or emulates an operating system (or at least portions thereof), and institutes specialized modules for performing certain functions as will be described below.

The term "module" as used herein means a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the module to implement the particular functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor(s) of one or more computers that execute an operating system, system programs, and application programs, while also implementing the module using multitasking, multithreading, distributed (e.g., cloud) processing where appropriate, or other such techniques. Accordingly, each module can be realized in a variety of suitable configurations, and should generally not be limited to any particular implementation exemplified herein, unless such limitations are expressly called out.

Thus, each virtual machine, configured to execute on a general-purpose computer or server, and being configured for specific functionality constitutes a number of modules, It is also contemplated that, in various embodiments, virtual machines 702 are implemented on multiple different physical computer systems, which may or may not be geographically distributed. Other embodiments are contemplated in which virtual machines 702 are implemented on a single computer system or server. Still other embodiments are contemplated in which separate individual computer systems are utilized in lieu of virtual machines. However, for the sake of brevity, the following embodiments shall be described in the context of the virtual machine embodiments.

Each virtual machine 702 is configured to operate automatically, i.e., under program control. Virtual machines 702 are each configured such that, in operation, each virtual machine 702 receives list 706 of initial hosts to be investigated using the techniques described above.

Using browser module 704, each of the virtual machines 702 sequentially explores (e.g., loads or browses) all the hosts that are listed in its corresponding list 706. In a related embodiment, each browser 704 explores all of the links listed on the loaded web pages to a specified depth of nesting, for example, up to 5 links. The investigation is tracked, with the actions taken in the course of exploring the hosts on the network recorded in exploration tracking log 712 for each virtual machine.

In one related type of embodiment, virtual machines 702 are configured to employ technologies such as VPN, PPTP, IPSec, L2TP and the like to vary their entry point to the network, and explore the route of access to the researched host from another provider, from another country, or from another region of the world. Such an approach facilitates automatically detecting threats targeted to particular groups of users.

Optionally, each virtual machine 702 is configured to detect malware in the course of the exploration of the initial hosts and of other explored hosts arrived at in the course of exploration that started at the initial hosts. In each virtual machine 702, infection detector module 708 maintains a virtual system disk, a virtual system registry and a virtual system memory. After having browser 704 run for a while, e.g., 5-10 minutes, infection detector module 708 takes a snapshot of the virtual system disk, virtual system registry and virtual system memory. The virtual system disk, a virtual system registry and a virtual system memory are then restored to their initial state and the same process is repeated with the next URL address for the exploration. Snapshots of the virtual system disk, system registry and memory are compared by infection detector module 708 with their the initial state. If any of the URLs being examined contains malicious software, then the virtual machine 702, not having the critical security provisions, will obtain a new executable program, program modules, or changes to a branch of the registry, for example. If infection detector 708 does not detect unexpected and unwanted new files or changes to the registry after the exploration of the given host, the host can be considered safe.

In one approach, the operating systems and software of the virtual machines 702 do not contain security provisions that prevent malware infection and are therefore susceptible such infection. In another approach, the virtual machines 702 are configured with certain minimal security provisions, such that infection of these virtual machines requires an infection vector that works around the security provisions which are present. This latter approach focuses the network host blocking on only those pathways which distribute more virulent forms of malware.

In a related embodiment, the use of several virtual machines configured with successively stronger levels of security, a system can obtain a measure of virulence of a particular piece of malware. In this approach, the strength or quality of protection against infection present on a virtual machine 702 that has become infected as a result of accessing a certain host is associated with that host in log 712.

Figure 8:
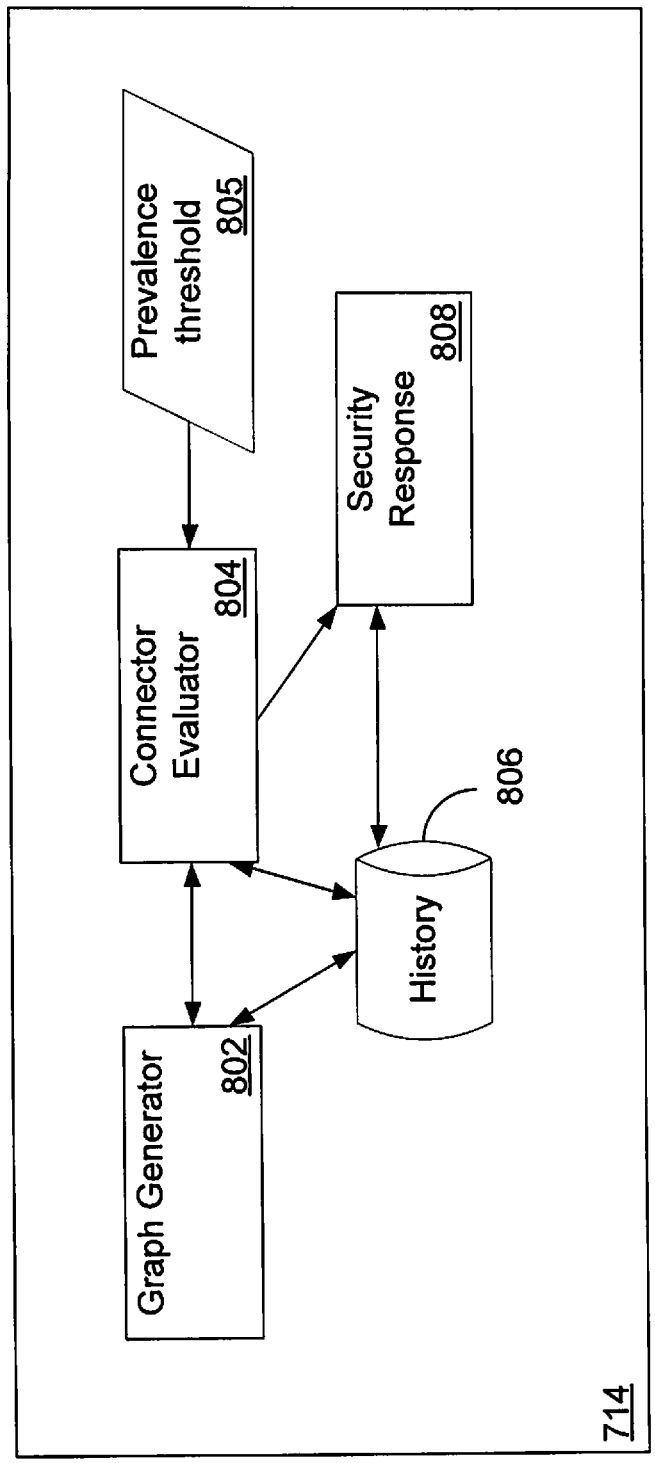
FIG. 8 is a block diagram illustrating an analysis module of the system of FIG. 7 in greater detail.

The resulting table of URL exploration results stored in log 712 is read by analysis module 714. One exemplary embodiment of analysis module 714 is illustrated in as a block diagram in FIG. 8. Graph generator module 802 is adapted to generate graphs of inter-host communication on the network. In one approach graph generator module 802 builds a graph using the data from the URL exploration results, based on one or more of the following principles for determining the prevalence of connectors between the hosts.

In one embodiment, the construction of the graph reflects the actual topology of information channels between network hosts and is constructed in accordance with actual routes across the network. The hosts on the graph contain IP addresses of intermediary hosts along the route of data across the network to the site at the specified URL, obtained through the use of tools such as tracert or traceroute.

Connector evaluator module 804 analyzes the connectors between the hosts, which indicate that there is an association (i.e., working relationship) between the hosts, and further represent a measure of the prevalence of each connector. In various embodiments, connectors represent any one of, or any combination of, a communication channel, a tunnel, links, redirects, and the like. The prevalence of the connectors can be determined by connector evaluator module 804 based at least in part on the intensity of use of this connector to transmit information or otherwise facilitate browsing to arrive at a source of malicious software. In one particular embodiment, the intensity of use of a given connector represents how much, or how often, this connector plays a role in accessing malicious websites. As discussed above, prevalence of the connector can be represented by the relative degree, e.g., as a percentage, or absolute measure, such as number of connections established, in the use of this connector for access to a particular host, such as a known trusted host.

Host history module 806 stores relevant information about each suspected host and, using the output of connector evaluator module 804, represents a measure of regularity of use of a particular intermediary host. This information can be included in the graph that is generated. Connector evaluator module 804 performs a comparison of the prevalence of connectors along pathways to each of the investigated hosts against a prevalence threshold 805. Connector evaluator module 804 identifies, among the hosts situated along multiple pathways to a common investigated host, any suspicious host that is associated with a connector having a low prevalence that is below the prevalence threshold 805. This indicates that the suspicious host is likely used for malicious activity. In response, security response module 808 associates that suspicious host with a restriction. For instance, the intermediary host can be indicated as a host to be blocked outright or otherwise have access to it otherwise restricted (e.g., with a warning message requiring user permission before access to the host can be granted).

In one embodiment, prevalence threshold 805 is based on a statistically typical prevalence among the connectors along at least one pathway. This can be based on the history record.

Referring again to FIG. 7, in one example of blocking, the IP address of the malicious host or intermediary host to be blocked is placed in the restricted host database 716 (which in this example is a list of blocked sites), which is used to protect users by preventing them from being able to access (or have messages routed through) restricted hosts. In various embodiments restricted host database 716 includes a list of blocked or otherwise restricted hosts and, in embodiments in which there are multiple levels or classes of restriction, the nature of the restriction level or class is also included.

In the embodiment depicted, security configuration module 718 is configured to provide updates to protection mechanism 720 based on restricted host database 716. Examples of protection mechanisms that can constitute protection mechanism 720 include an intrusion prevention system, an object pathway filter, a network address filter, or any combination thereof, residing at a client's computer system or subnet, at a proxy server, or both. In certain implementations, protection mechanism 720 is a module that is licensed by the service provider that operates, controls, or otherwise coordinates the virtual machines 702, analysis module 714, and security configuration module 718. Also, in certain implementations, the protection mechanism is situated in a computer system that is distinct from the analysis module 714.

Each update can include a host restriction set, such as the latest version of restricted host database 716, or some relevant portion thereof. Based on the host restriction set provided, protection mechanism 720 is configured to restrict access to the addresses of hosts contained in the restricted host database according to the restriction level for each restricted host.

In one simple example, the blocking of all addresses in the restricted host database 716 is done using path filtering. The path filter checks the addresses of hosts to which the request is sent over the network or from which a response came, i.e., compares the host address with the data in the restricted host database 716. When a match is made the information exchange between each of the addresses specified in the restricted host database 716 is blocked by protection mechanism 720.

Figure 9:
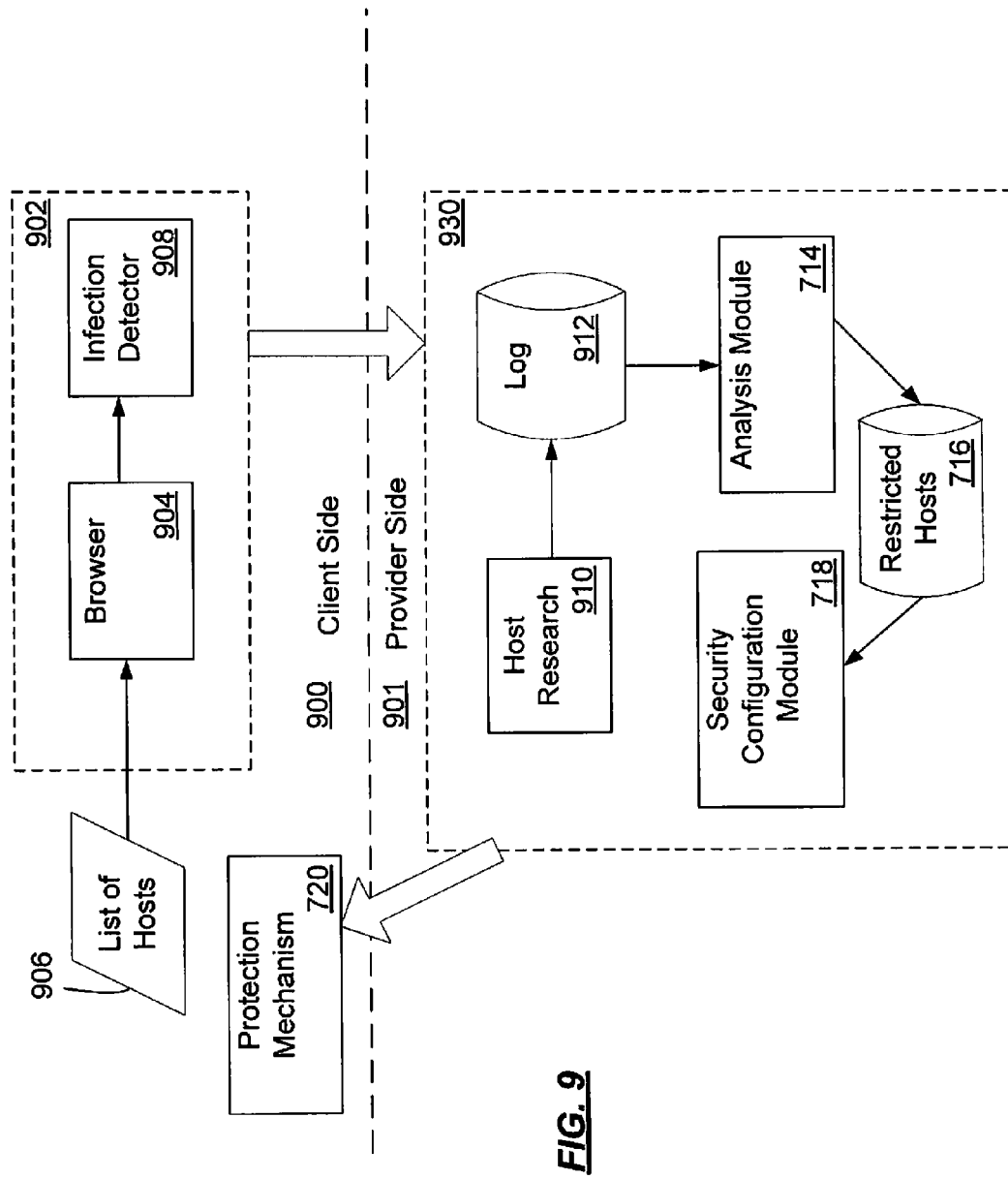
FIG. 9 illustrates a distributed model in which specialized agents run on participating computer systems (or network devices) to pre-screen network hosts according to one embodiment.

Referring now to FIG. 9, in another example arrangement, a distributed model is utilized in which specialized agents run on participating computer systems (or network devices) to pre-screen network hosts. In one such approach, as depicted in FIG. 9, data gathering system 902 (e.g., one or more virtual machines, each having a browser 904 and infection detector 908, or an actual physical system with a real operating system) is implemented on client side 900 at participating client PCs, or elsewhere in the client side local network, such as at an intrusion prevention system, proxy server, firewall module, or the like. The record of URL exploration results is transmitted by each distributed processing host to a centralized system 930, which may also be a cloud computing model at service provider side 901. The missing information needed for completing the table of exploration of URL results is collected by research host 910 in the same way as described above. Log 912 gathers and maintains the records of malicious pages and the intermediary hosts leading to those pages. Analysis module 714, restricted host database 716, and security configuration module 718 operate as described above. Centralized system 930 configures protection mechanism 720 on the client side to enforce the blocking or restrictions of malicious and intermediary hosts, as determined by analysis module 714.

In one type of embodiment, list of hosts 906 to be browsed and studied is supplied by centralized system 930 based on determined information needs. In another type of embodiment, list of hosts 906 is generated locally, on the client side 900, based on the types of hosts typically visited by the user on client side 900. For instance, Web search results generated in response to the user's search queries can be analyzed before the user actually navigates to those sites. In a related embodiment, links and other pages on a given Website being visited by a user are analyzed proactively before the user follows those links. In another related embodiment, to improve performance and minimize delay in the user's browsing experience, the forward-looking links are passed to a cloud computing model for distributed processing analysis.

Figure 10:
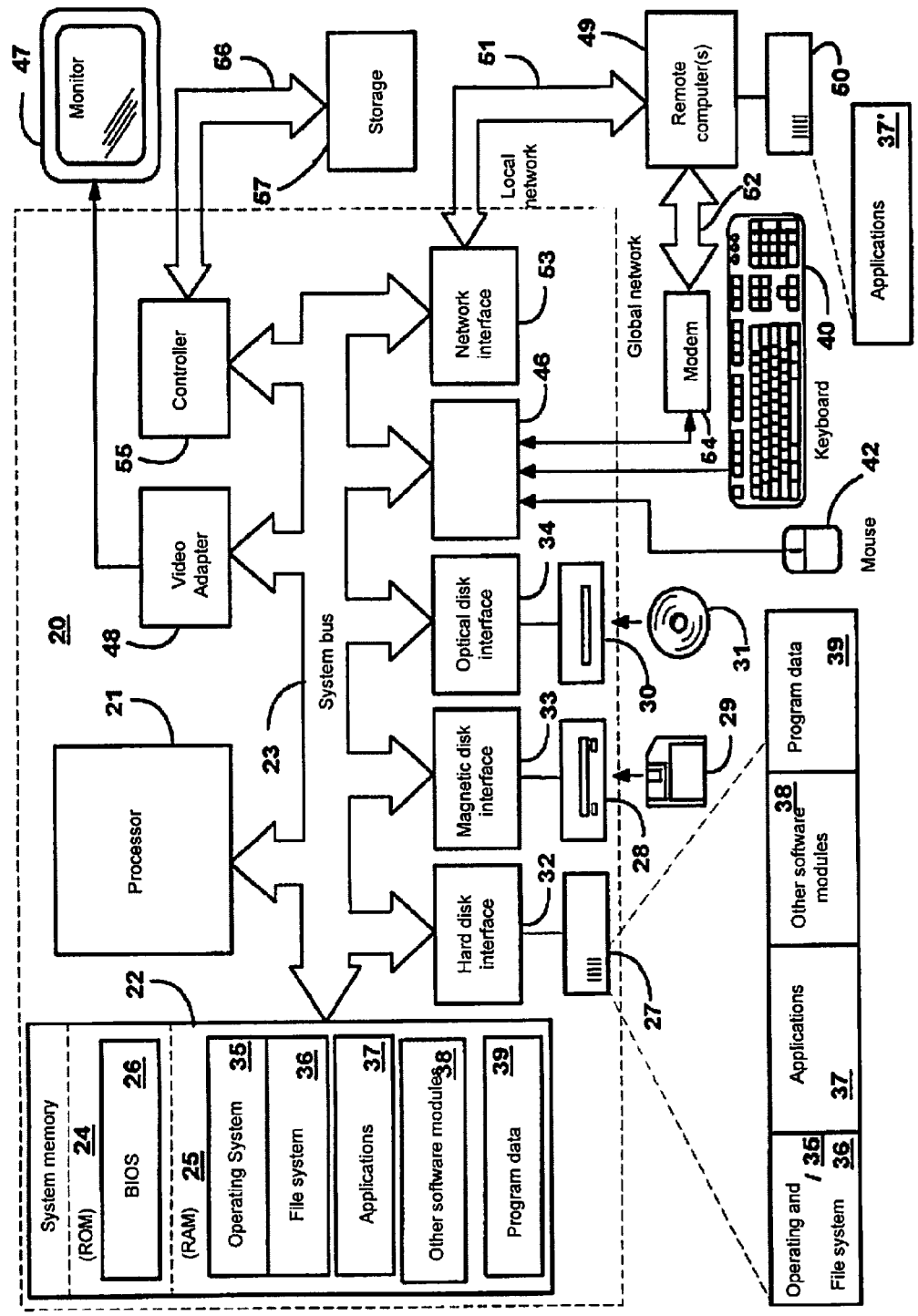
FIG. 10 is a block diagram illustrating an exemplary general-purpose computer system on which one or more functional modules according to embodiments of the invention can be implemented.

FIG. 10 is a block diagram illustrating an exemplary general-purpose computer system on which one or more functional modules of the system can be implemented. Personal computer or server 20 contains a processor 21, system memory 22 and system bus 23, which contains various system components, including memory associated with processor 21. The system bus 23 is implemented as any known in bus structure, including a bus memory, bus memory controller, peripheral bus and local bus, which can interact with any other bus architecture. System memory includes read only memory (ROM) 24, and random access memory (RAM) 25. Basic input/output system (BIOS), containing the main procedures that ensure the transfer of information between the elements of the personal computer 20, for example, at boot time using the ROM 24.

The personal computer 20 contains a hard drive 27 for reading and writing, magnetic disk drive 28 for reading and writing to removable magnetic disk 29 and an optical drive 30 for reading and writing to removable optical disk 31, such as CD-ROM, DVD-ROM or other optical media. The hard disk drive 27, magnetic disk drive 28, optical drive 30 are all connected to the system bus 23 via the hard disk interface 32, magnetic disk drive interface 33 and an optical drive interface 34, respectively. Drives and the corresponding computer storage media are non-transitory, and non-volatile storage means of computer instructions, data structures, program modules and other data of a personal computer 20. This description reveals the implementation of a system, which uses a hard disk, removable magnetic disk 29 and a removable optical disk 31, but it should be understood that the use of other types of computer storage media that can store data in computer readable form (solid state disks, cassette tape, flash drive or other nonvolatile memory, digital disks, Bernoulli cartridges, random-access memory (RAM), read-only memories (ROM), etc.) is possible.

Some of the software modules, amongst which may be an operating system 35, are stored on a hard disk, magnetic disk 29, optical disk 31, ROM 24 or RAM 25. A computer 20 has a file system 36, which stores the operating system 35 and additional software applications 37, other program modules 38 and program data 39. The user has the ability to enter commands and information into a personal computer 20 through input devices (keyboard 40, Mouse 42). Other input devices may be (not shown): microphone, joystick, game console, satellite dish, scanner, etc. Such an input device are usually connected to the processor 21 through a serial port 46, which in turn is connected to the system bus, but may be connected by other means, such as a parallel port, game port or universal serial bus (USB). A monitor 47 or other type of display device is also connected to the system bus 23 via an interface such as a video adapter 48. In addition to the monitor 47, personal computer can be equipped with other peripheral output devices (not shown), such as speakers and printer, etc.

Personal computer 20 generally operates in a networked environment, using a logical connection to one or more remote computers 49. A remote computer (or computers) 49 is/are the same as personal computers, servers, routers, network stations, peering devices or another network host, and usually, have most or all of the elements previously described in the description of the substance of a personal computer 20, shown in FIG. 10, but only as a storage device 50 with applications 37. Logical connections include a local area network (LAN) 51 and wide area network (WAN) 52, such networks are common office equipment, and are also used in corporate computer networks, company intranets and the Internet.

When using LAN networks, a personal computer 20 is connected to LAN 51 via a network adapter or interface 53. When using the WAN networking, personal computer 20 has a modem 54 or other means of communication with the global computer network 52, such as the Internet. A modem 54, which may be internal or external, is connected to the system bus 23 via a serial port 46. In a networked environment software modules of exposed personal computers 20, or parts of such programs, are stored in remote storage devices. It should be pointed out that the network connections are merely illustrative and are not required to display the exact network configuration, network, i.e., in fact, there are other ways of establishing a logical connection, other technical means of communication of one computer to another.

It should be noted that aspects of the invention may be implemented using a computer system that is a subset of the general-purpose computer system described above. For instance, the computer system may be a blade server having a relatively limited set of input/output facilities. The computer system may also be implemented as an embedded system operating on a microcontroller digital signal processor, application-specific integrated circuit, field programmable gate array, or the like, provided that the system includes sufficient input/output facilities to enable it to interface with a subject computer system being managed or with other computing devices.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims that are included in the documents are incorporated by reference into the claims of the present application. The claims of any of the documents are, however, incorporated as part of the disclosure herein, unless specifically excluded. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. An automated computer-implemented method for detecting malicious activity in a computer network that includes hosts and connectors between the hosts, the method comprising:
   exploring, by a system of at least one computer running under program control, network pathways to a plurality of investigated hosts, wherein the network pathways to each of the plurality of investigated hosts are explored by the at least one computer from a first entry point to the computer network and a second entry point to the computer network, the second entry point being varied from the first entry point;
   forming a graph data structure based on results of the exploring of the network pathways, the graph data structure representing topology of explored portions of the computer network, including connectors between the investigated hosts and intermediary hosts situated along explored pathways that include the investigated hosts, and an indication of a prevalence of connectors in pathways to each of the investigated hosts;
   obtaining registration information for all of the plurality of investigated hosts;
   determining whether the registration information for a particular investigated host matches an address in a malicious host database;
   adding the address for the particular investigated host matching the registration information to the malicious host database;
   comparing the prevalence of connectors along pathways to each of the investigated hosts against a prevalence threshold;
   identifying, among the hosts situated along pathways to a common investigated host, any suspicious host that is associated with a connector having a low prevalence that is below the prevalence threshold, wherein the prevalence threshold comprises an intensity of use for the connector to transmit information to and from a particular host to determine the connector role in accessing malicious content;
   associating, by the system, an access restriction with the suspicious host and at least one intermediate host situated between the common investigated host and the connector and associated with the connector having a low prevalence, wherein each of the investigated hosts is a trusted host, and wherein the access restriction is applied to the at least one intermediate host that corresponds to a connector having a prevalence that is less than the prevalence value the connector used in a previous attempt to transfer data to and from the investigated host; and
   adding the suspicious host and the at least one intermediate host situated between the common investigated host and the connector and associated with the connector having a low prevalence to the malicious host database.

2. The method of claim 1, wherein the first entry point and the second entry point are on geographically distinct subnets.

3. The method of claim 1, wherein the exploring of network pathways using the first entry point and the second entry point includes exploring a plurality of different pathways to a common investigated host.

4. The method of claim 1, wherein exploring the network pathways includes controlling an execution environment selected from a group consisting of: a virtual machine, a sandbox, an execution environment in an internetwork device, or any combination thereof.

5. The method of claim 1, wherein the prevalence threshold is based on a statistically typical prevalence among the connectors along at least one pathway.

6. The method of claim 1, wherein the prevalence of connectors along pathways to each of the investigated hosts is determined among pathways from similar entry points into the network.

7. The method of claim 1, wherein determining the measure of prevalence of the connectors corresponding to each of the investigated hosts includes storing a history record of accessing each of the investigated hosts via corresponding intermediary hosts and, based on the history record, determining a measure of regularity of use of each connector for accessing each of the investigated hosts.

8. The method of claim 1, wherein the associating of the restriction with the suspicious host is includes blocking connectivity to that suspicious host.

9. The method of claim 1, further comprising:
   providing an update to a protection mechanism, the update including a set of the access restrictions associated with the suspicious host, wherein the update permits the protection mechanism to institute restrictions that limit access to the suspicious host.

10. The method of claim 1, further comprising:
    re-evaluating, the network pathways to the plurality of investigated hosts, including re-evaluating the prevalence of the connectors associated with the suspicious host; and
    in response to a determination that the prevalence of the connector of the suspicious host, previously indicated as having a low prevalence, has increased above the prevalence threshold, de-associating the access restriction with the suspicious host.

11. The method of claim 1, wherein forming a graph data structure based on results of the exploring of the network pathways further comprises:
    looking up registration information for each intermediate host along each of the pathways to find an identification of an owner of each intermediate host;
    associating a plurality of hosts with a common owner; and
    in response to a determination that any one of the plurality of hosts associated with a common owner is a suspicious host, identifying other hosts associated with the common owner as suspicious hosts.

12. A system for detecting malicious activity in a computer network that includes hosts and connectors between the hosts, the system comprising:
    computing hardware including at least one processor, non-transitory data storage interfaced with the at least one processor, and input/output facilities including network interfacing facilities, the data storage containing instructions that, when executed, establish:
       a controllable execution environment module implemented in the computing hardware according to the instructions to explore network pathways to a plurality of investigated hosts, wherein the network pathways to each of the plurality of investigated hosts are explored by the computing hardware from a first entry point to the computer network and a second entry point to the computer network, the second entry point being varied from the first entry point; and
       a graphing module implemented in the computing hardware according to the instructions to form a graph data structure based on results of the exploring of the network pathways, the graph data structure representing topology of explored portions of the computer network, including connectors between the investigated hosts and intermediary hosts situated along explored pathways that include the investigated hosts, and an indication of a prevalence of connectors in pathways to each of the investigated hosts;

a connector evaluator module implemented in the computing hardware according to the instructions to compare the prevalence of connectors along pathways to each of the investigated hosts against a prevalence threshold, and to identify, among the hosts situated along pathways to a common investigated host, any suspicious host that is associated with a connector having a low prevalence that is below the prevalence threshold, wherein the prevalence threshold comprises an intensity of use for the connector to transmit information to and from a particular host to determine the connector role in accessing malicious content, wherein the connector evaluator module is further configured to obtain registration information for all of the plurality of investigated hosts, determine whether the registration information for a particular investigated host matches an address in a malicious host database, and add the address for the particular investigated host matching the registration information to the malicious host database; and a security response module implemented in the computing hardware according to the instructions to associate an access restriction with the suspicious host and at least one intermediate host situated between the common investigated host and the connector and associated with the connector having a low prevalence, wherein each of the investigated hosts is a trusted host, and wherein the access restriction is applied to the at least one intermediate host that corresponds to a connector having a prevalence that is less than the prevalence value the connector used in a previous attempt to transfer data to and from the investigated host, wherein the connector evaluator module is further configured to add the suspicious host and the at least one intermediate host situated between the common investigated host and the connector and associated with the connector having a low prevalence to the malicious host database.

13. The system of claim 12, wherein the first entry point and the second entry point are on a plurality of geographically distinct subnets.

14. The system of claim 12, wherein the controllable execution environment module is configured, via the instructions, to control an execution environment selected from a group consisting of: a virtual machine, a sandbox, an execution environment in an internetwork device, or any combination thereof.

15. The system of claim 12, wherein the prevalence threshold is based on a statistically typical prevalence among the connectors along at least one pathway.

16. The system of claim 12, wherein the prevalence of connectors along pathways to each of the investigated hosts is determined among pathways from similar entry points into the network.

17. The system of claim 12, wherein the connector evaluator module is configured, via the instructions, to store a history record of accessing each of the investigated hosts via corresponding intermediary hosts and, to determine, based on the history record, a measure of regularity of use of each connector for accessing each of the investigated hosts.

18. The system of claim 12, wherein the security response module is configured, via the instructions, to block connectivity to the suspicious host.

19. The system of claim 12, wherein the controllable execution environment module is configured, via the instructions, to explore a plurality of different pathways to a common investigated host.

20. The system of claim 12, wherein the security response module is further configured, via the instructions, to provide an update to a protection mechanism, the update including a set of the access restrictions associated with the suspicious host, wherein the update permits the protection mechanism to institute restrictions that limit access to the suspicious host.

21. The system of claim 12, wherein:
the controllable execution environment module is configured, via the instructions, to re-evaluate, the network pathways to the plurality of investigated hosts, such that the prevalence of the connectors associated with the suspicious host is re-evaluated; and
wherein the connector evaluator module is configured, via the instructions, to de-associate the access restriction with the suspicious host in response to a determination that the prevalence of the connector of the suspicious host, previously indicated as having a low prevalence, has increased above the prevalence threshold.

22. The system of claim 12, wherein the graphing module is configured, via the instructions, to:
look up registration information for each intermediate host along each of the pathways to find an identification of an owner of each intermediate host;
associate a plurality of hosts a common owner; and
wherein the security response module is configured, via the instructions, to identify other hosts associated with the common owner as suspicious host in response to a determination that any one of the plurality of hosts associated with the common owner is a suspicious host.

23. An automated computer-implemented system for detecting malicious activity in a computer network that includes hosts and connectors between the hosts, the system comprising:
means for exploring network pathways to a plurality of investigated hosts, wherein the network pathways to each of the plurality of investigated hosts are explored by the means for exploring network pathways from a first entry point to the computer network and a second entry point to the computer network, the second entry point being varied from the first entry point;
means for forming a graph data structure based on results of the exploring of the network pathways, the graph data structure representing topology of explored portions of the computer network, including connectors between the investigated hosts and intermediary hosts situated along explored pathways that include the investigated hosts, and an indication of a prevalence of connectors in pathways to each of the investigated hosts;
means for obtaining registration information for all of the plurality of investigated hosts;
means for determining whether the registration information for a particular investigated host matches an address in a malicious host database;

means for adding the address for the particular investigated host matching the registration information to the malicious host database;

means for comparing the prevalence of connectors along pathways to each of the investigated hosts against a prevalence threshold;

means for identifying, among the hosts situated along pathways to a common investigated host, any suspicious host that is associated with a connector having a low prevalence that is below the prevalence threshold, wherein the prevalence threshold comprises an intensity of use for the connector to transmit information to and from a particular host to determine the connector role in accessing malicious content;

means for associating an access restriction with the suspicious host and at least one intermediate host situated between the common investigated host and the connector and associated with the connector having a low prevalence, wherein each of the investigated hosts is a trusted host, and wherein the access restriction is applied to the at least one intermediate host that corresponds to a connector having a prevalence that is less than the prevalence value the connector used in a previous attempt to transfer data to and from the investigated host; and means for adding the suspicious host and the at least one intermediate host situated between the common investigated host and the connector and associated with the connector having a low prevalence to the malicious host database.

* * * * *